Sept. 1, 1953
A. J. HORNFECK
2,651,011
ELECTRIC MOTOR CONTROL SYSTEM RESPONSIVE
TO FLUID PRESSURE SIGNAL
Filed Oct. 26, 1949
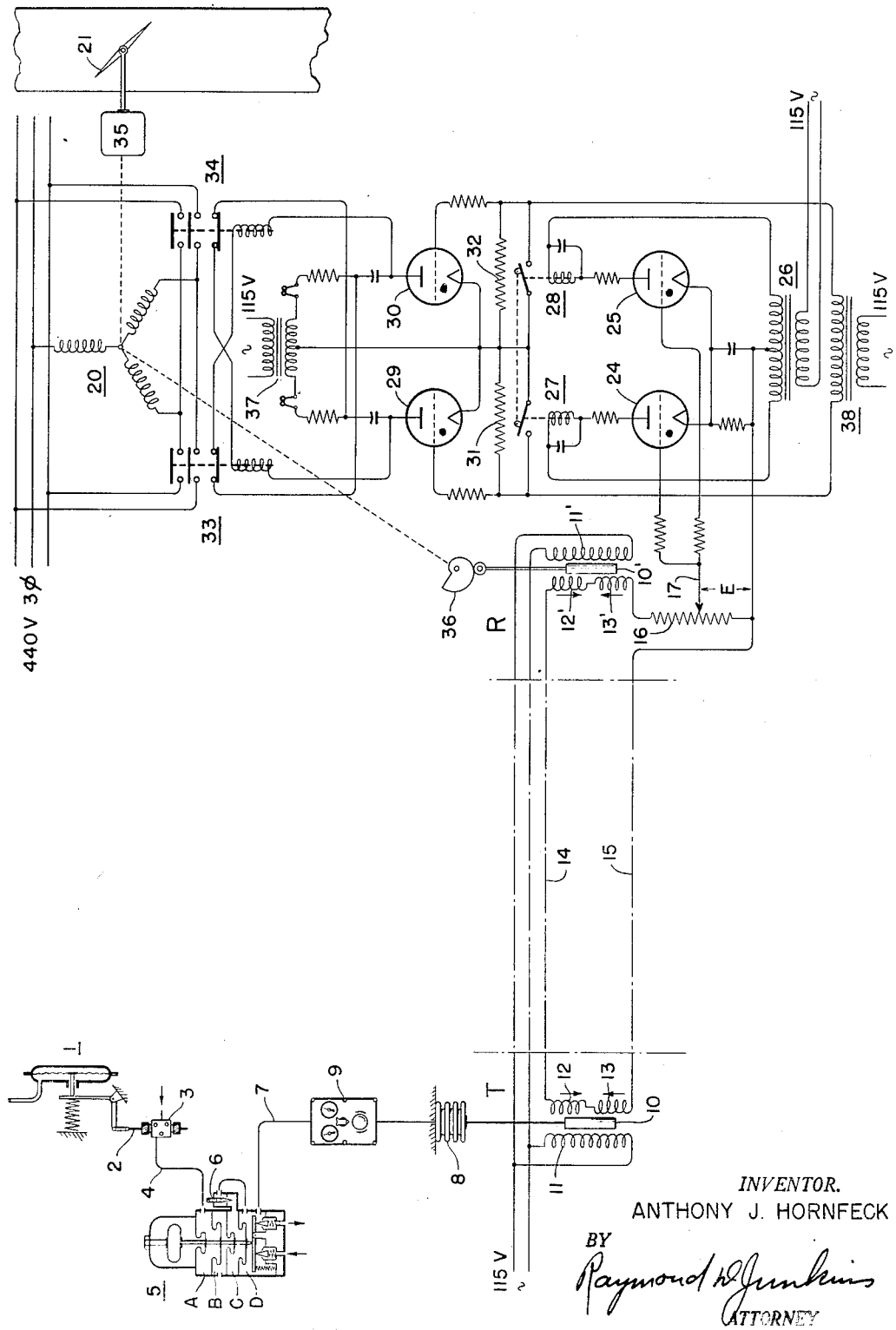
INVENTOR.
ANTHONY J. HORNFECK
BY
Raymond D. Junkins
ATTORNEY Patented Sept. 1, 1953

2,651,011

UNITED STATES PATENT OFFICE 2,651,011

ELECTRIC MOTOR CONTROL SYSTEM RESPONSIVE TO FLUID PRESSURE SIGNAL

Anthony J. Hornfeck, Lyndhurst, Ohio, assignor to Bailey Meter Company, a corporation of Delaware Application October 26, 1949, Serial No. 123,671

2 Claims. (Cl. 318—28)

My invention relates to control systems and particularly to systems sensitive to the value, or change in value, of a variable condition, position, or the like; for regulating an agent which may or may not affect the value of the variable.

The variable may be fluid rate of flow, temperature, pressure, voltage, humidity, or the like, and the agent may be regulated by moving a damper, valve or similar regulating device.

It frequently happens that the measuring and controlling apparatus, sensitive to the variable, is adapted or is desirably to be adapted, to establish a fluid pressure signal for control purposes; while the damper or other device to be controlled is to have an electric motor as the power means. It thus becomes necessary to interrelate such apparatus with the power means for control of the latter and this requires the control of one form of energy by means of a signal of another form of energy.

A principal object of my invention is to provide a system and apparatus for remotely or locally controlling an electric power motor from a pneumatic control system or, stated slightly differently, to provide an electric positioning control of an electric power motor from an air pressure signal.

Specifically, the invention provides a system and apparatus for remotely or locally controlling the relatively large electrical power of a reversible power motor by the relatively small electrical signal produced in a balanceable electric telemetering network responsive to a fluid pressure impulse representative of a variable.

The single figure of the drawing diagrammatically illustrates a preferred embodiment of my invention although it will be understood that this is by way of example only and that the invention may take various forms and may be embodied in different systems and the like.

Referring now to the drawing, I show at 1 a furnace pressure measuring device comprising a spring loaded diaphragm which is subjected to a relatively low pressure to be maintained at a predetermined value. The pressure sensitive device is arranged to vertically position the stem 2 of the pilot valve 3 which may be of the type disclosed and claimed in the patent to Johnson 2,054,464 to establish in a pipe 4 a fluid loading pressure definitely related to the vertical position of the stem 2 and thereby representative of the pressure (variable) to which the device 1 is subjected.

The pipe 4 joins the A chamber of a standardizing relay 5 such as is disclosed and claimed in the Gorrie Patent Re. 21,804. The B chamber is open to the atmosphere. The C and D chambers are connected by an adjustable fluid resistance 6 and the control pressure developed as an output of relay 5 is available within the pipe 7 leading to a bellows 8. Interposed in the pipe 7 is a manual-automatic selector valve 9 providing the possibility of imposing upon the bellows 8 a fluid loading pressure either automatically established by the pilot 3 or as established manually by the mechanism 9. In general it may be said that a fluid loading pressure is established within the pipe 7 varying in sense and magnitude as determined by departure of the pressure in device 1 from predetermined or desired value.

The movable wall of the bellows 8 is arranged to position the core 10 of a transmitter T which may be located remotely from a receiver R which is desirably located near the device whose position is to be controlled.

The transmitter T comprises a transducer including the fluid pressure sensitive bellows 8 and the movable core transformer. The latter has an alternating current energized primary 11 and a pair of series connected secondary windings 12, 13.

The receiver R similarly has an energized primary 11', a pair of secondaries 12', 13', and a movable core 10'. Connecting the secondary windings 12, 13, 12', 13' in series-loop are conductors 14 and 15. As indicated on the drawing these conductors may be of considerable length spacing the transmitter T from the receiver R and comprising a telemetering of the pneumatic signal existing in pipe 7 to the receiver location.

Interposed in the conductor 15 is an adjustable resistance 16 having a movable contact arm 17. Contact arm 17 is hand adjustable along the resistance 16 to provide a sensitivity adjustment for the system. Between the arm 17 and the conductor 15 may appear a voltage signal E in-phase or out-of-phase with the alternating current supply.

When the position of the core 10', relative to the windings 11', 12' and 13', is in predetermined relation to the position of the core 10 relative to its related windings 11, 12, 13 the network is in balance and no voltage appears across 17, 15, and $E=0$. If the core 10 is moved in one direction the system is unbalanced and the signal E is of a phase and magnitude determined by the direction of movement of the core and the extent of such movement. The operation is such that upon a change in position of the core and consequent unbalance of the circuit the signal E causes the positioning of the core 10' in proper direction and amount to rebalance the circuit and reduce E to 0.

I will now describe the manner in which the signal E controls a three phase alternating current power motor 20 for positioning a damper 21 and simultaneously causing a rebalancing positioning of the core 10'.

At 24 and 25 I show thyratrons whose control grids are connected to 17. It will be seen that the thyratrons 24, 25 are so connected to a transformer 26 that the plate supply voltage of one of the thyratrons is 180° out of phase with that of the other. When the signal E is the same phase (for example) as thyratron 24 it fires 24 energizing a relay 27. When the signal E is of opposite phase with 24 but is of the same phase with 25 then the thyratron 25 fires energizing the relay 28. Thus the thyratrons 24, 25 are selectively fired in dependence upon the phase of the signal E. The length of time during which either of the thyratrons 24, 25 is fired is determined by the length of time that the signal E persists and this in turn upon the length of time during which the telemetering circuit remains out of balance, i. e. until movement of the core 10' has restored the network to balance.

While I purposely use thyratrons as the elements 24, 25 for sensitivity it will be understood that vacuum tubes with a preamplifier may equally as well be used in this network.

Preferably the relays 27 and 28 should be either electrically or mechanically interlocked so that there is no possibility of both being closed at the same time or of chattering by rapid opening and closing of the two. I have very schematically shown by dotted line the possibility of so interlocking the relays that the second relay cannot close while the first is closed and vice versa.

At 29 and 30 I show power thyratrons which are connected to transformer 37 so that their plate supply voltages are 180° out of phase. The thyratrons 29, 30 are selectively fired through energization of relays 27, 28 respectively.

In the grid circuit of thyratron 29 is a resistance 31 while in the grid circuit of thyratron 30 is a similar resistance 32. The action of the relays 27, 28 is such as to selectively short out one or the other of the resistances 31, 32. In general, the energization of relay 27 shorts across the resistance 31 thereby removing the out of phase bias voltage supplied from transformer 38 which has prevented thyratron 29 from firing. Similarly energization of relay 28 shorts the resistance 32 thereby removing the out of phase bias voltage which has prevented thyratron 30 from firing. As previously mentioned the relays 27, 28 are either electrically or mechanically interlocked so that the thyratrons 29 and 30 cannot be simultaneously fired.

Thyratrons 29 and 30 respectively control the main line contactors 33 and 34 for controlling the energization of power motor 20 for rotation in one direction or the other. The three-phase power motor 20 drives through a gear reduction 35 to position the damper 21 and at the same time is arranged, through necessary gear reduction, to move a cam 36 thereby positioning the core 10' in proper direction and amount to cause rebalancing of the telemetering circuit.

In the example being described, the pressure which is being measured by the device 1 is presumably a furnace pressure controlled by position of the damper 21. Thus if pressure at the device 1 decreases from predetermined value the system acts to open the damper 21 thereby returning the pressure toward its desired value. Similarly should the pressure at 1 increase above desired value the result is a positioning of damper 21 in a direction tending to return said pressure to its predetermined value. The result is a positioning type of control with floating characteristics superimposed thereupon to the end that the pressure at device 1 is returned to desired value upon any departure therefrom.

While I have illustrated and described a preferred embodiment of my invention in connection with the control of a damper whose positioning affects the value of a variable such as pressure it will be understood that this is by way of example only and that the control system might equally as well be arranged to control the value of temperature, rate of flow, position, or similar variables by the power positioning of dampers, valves or any mechanism. Furthermore, it is not necessary that the power actuated damper or the like affect the value of the particular variable whose value is used to initiate operation of the power device. For example, in the example previously described, it is not necessary that a movement of damper 21 actually result in a variation in value of the pressure effective at device 1. It is quite possible that the damper 21 may control a variable condition of quite a dissimilar system than that to which the device 1 is sensitive, it only being desirable that the damper 21 be positioned in accordance with variations of pressure at device 1.

Furthermore, it will be understood that the type of electric circuit, contactors, power motors, etc., illustrated and described is not a limiting feature but is chosen only by way of example. The invention does however contemplate that the movement of the power source such as 20 will cause a rebalancing, as for instance a positioning of the core 10'.

The invention is particularly adapted to the establishment of a fluid pressure signal which may be telemetered as such or may be transduced into an electric value signal which may then be telemetered, but, in either case, the telemetered pneumatic signal or telemetered electric signal causes an operation of a power means in desired direction and extent for power operation of a controlling device and for simultaneously causing a rebalancing of at least a portion of the system.

What I claim as my invention and desire to secure by Letters Patent of the United States, is:

1. A control system for positioning a damper or the like for regulating the value of a variable including, in combination, a reversible electrical power regulator for positioning the damper or the like, means sensitive to the variable which establishes a fluid pressure continuously representative of the value thereof, a balanceable telemetering network including two movable core transformers, means positioning an element of the first of the movable core transformers in accordance with the said fluid pressure, electronic circuit means phase sensitive to the relatively small electrical value of the network unbalance for controlling the direction of application of the relatively large power of the said reversible electrical regulator, means connecting said regulator to an element of the second transformer whereby balance is restored in the network, the said electronic circuit consisting of two systems, the first system having two tubes selectively sensitive to the network unbalance and selectively activating one switch of the first switch bank, the second system having two tubes selectively controlled by the first switch bank and selectively activating one switch of a second switch bank in control of the direction of power supplied to the reversible electrical regulator.

2. A control system including, in combination, means sensitive to and establishing a fluid control pressure continuously representative of a condition of a variable, a first movable core transformer with a core positioned in accordance with the fluid pressure, an electrical network including the first movable core transformer and a second movable core transformer, a first electronic means phase-sensitive to the relatively small unbalance signal of the network and controlling a first switching set, and a second electronic means under control of the first switching set and controlling a second switching set directing the relatively large electrical power of a reversible motor, means actuated by said motor to move the core of the second transformer to balance the network, and means driven by said motor to control the said condition to which said means is sensitive.

ANTHONY J. HORNFECK.

References Cited in the file of this patent

UNITED STATES PATENTS

| Number | Name | Date |
| --- | --- | --- |
| 1,614,192 | Ewald | Jan. 11, 1927 |
| 1,800,303 | Lindsay | Apr. 14, 1931 |
| 2,085,128 | Staage | June 29, 1937 |
| 2,105,598 | Hubbard | Jan. 18, 1938 |
| 2,275,317 | Ryder | Mar. 3, 1942 |
| 2,320,881 | Newton | June 1, 1943 |
| 2,331,698 | Keeler | Oct. 12, 1943 |
| 2,336,492 | MacKay | Dec. 14, 1943 |
| 2,439,891 | Hornfeck | Apr. 20, 1948 |